(12) United States Patent
Schaefer et al.

(10) Patent No.: US 8,790,809 B2
(45) Date of Patent: Jul. 29, 2014

(54) BATTERY HAVING A HOUSING PARTIALLY FILLED WITH COOLING FLUID

(75) Inventors: Tim Schaefer, Niedersachswerfen (DE); Andreas Gutsch, Luedinghausen (DE); Claus-Rupert Hohenthanner, Hanau (DE); Joerg Kaiser, Kamenz (DE); Holger Mikus, Kamenz (DE)

(73) Assignee: Li-Tec GmbH, Kamenz (DE)

( * ) Notice: Subject to any disclaimer, the term of this patent is extended or adjusted under 35 U.S.C. 154(b) by 166 days.

(21) Appl. No.: 13/146,484

(22) PCT Filed: Jan. 28, 2010

(86) PCT No.: PCT/EP2010/000523
§ 371 (c)(1),
(2), (4) Date: Mar. 13, 2012

(87) PCT Pub. No.: WO2010/086167
PCT Pub. Date: Aug. 5, 2010

(65) Prior Publication Data
US 2012/0183830 A1     Jul. 19, 2012

(30) Foreign Application Priority Data
Jan. 28, 2009  (DE) .................. 10 2009 006 426

(51) Int. Cl.
*H01M 10/50*     (2006.01)
(52) U.S. Cl.
USPC ........................................ 429/120

(58) Field of Classification Search
USPC ............................................... 429/120
See application file for complete search history.

(56) References Cited

U.S. PATENT DOCUMENTS

| 3,390,014 A | 6/1968 | Eisler | |
|---|---|---|---|
| 6,106,972 A * | 8/2000 | Kokubo et al. | 429/120 |
| 7,974,095 B2 * | 7/2011 | Murata | 361/699 |
| 2006/0159991 A1* | 7/2006 | Takeshita et al. | 429/179 |
| 2006/0214641 A1* | 9/2006 | Cho | 320/150 |
| 2008/0008934 A1* | 1/2008 | Wu | 429/161 |
| 2008/0305388 A1 | 12/2008 | Haussman | |

FOREIGN PATENT DOCUMENTS

| DE | 19829293 | 1/1999 |
|---|---|---|
| EP | 1990860 | 11/2008 |
| GB | 2295264 | 5/1996 |
| JP | H1126031 A | 1/1999 |

OTHER PUBLICATIONS

International Search Report for PCT/EP2010/000523 mailed May 19, 2010.
Office Action for JP2011-546712, dated Nov. 26, 2013 (5 pages).

* cited by examiner

*Primary Examiner* — Muhammad Siddiquee
(74) *Attorney, Agent, or Firm* — Choate, Hall & Stewart LLP; Andrea L. C. Robidoux

(57) ABSTRACT

Battery 1, comprising at least a battery cell 2, which is arranged within a battery housing 3, characterized in that the battery housing 3 is partially filled with a cooling liquid 4. Method for cooling of said battery, wherein at least a portion of the cooling liquid 4 is evaporated.

9 Claims, 4 Drawing Sheets

BATTERY HAVING A HOUSING PARTIALLY FILLED WITH COOLING FLUID

CROSS-REFERENCE TO RELATED APPLICATIONS

This application is a National Phase application under 35 U.S.C. §371 of International Application No. PCT/EP2010/000523, filed Jan. 28, 2010 and published as WO 2010/086167 on Aug. 5, 2010, which claims priority to German patent application serial number DE 102009006426.5, filed Jan. 28, 2009, the entirety of each of which is hereby incorporated herein by reference.

Priority application DE 10 2009 006 426 as filed on Jan. 28, 2009 is fully incorporated by reference herein.

BACKGROUND

The present invention relates to a battery, which, for example, may be used in an electrically driven motor vehicle.

An electrochemical storage device is known from DE 602 13 474 T2, which comprises a plurality of electrochemical cells, which are arranged at a distance from each other. A cooling bellow is arranged between two side surfaces of the electrochemical cells, which cooling bellow touches the side surfaces of the electrochemical cells. A heat transfer medium flows through the cooling bellow.

The present invention has the objective to improve on a battery of the above described type.

SUMMARY

The underlying objective of the invention is achieved by the provision of a battery, comprising at least a battery cell, which is arranged within a battery housing, wherein the battery housing is partially filled with a cooling liquid.

A battery or battery cells generally refer(s) to non-rechargeable primary batteries or, respectively, to primary battery cells, as well as rechargeable secondary batteries or, respectively, secondary battery cells. A battery cell comprises, in particular, an electrical cell, which has at least two electrodes and an electrolyte, which is arranged between the two electrodes. Electrical energy is stored within the electric cell, wherein the electric cell is used for the conversion of chemical into electrical energy. In case the battery cell is a secondary battery cell, electrical energy can also be converted into chemical energy.

The term "partially filled" refers to the battery housing at least being filled with a certain amount of a cooling liquid. However, the battery housing is not completely filled with a cooling liquid. This leads to the result that a certain amount of gas remains within the housing, which is freely movable within the cooling liquid and within the battery housing. This amount of gas may comprise any gaseous media, in particular air, vapor of the cooling liquid, other gases, or combinations thereof.

The cooling liquid may freely flow, in particular, between the battery cells and thus may come into direct, i.e. directly mediated contact with the battery cells. Since the battery housing is partially, hence not completely, filled with a cooling liquid, the cooling liquid can flow more freely or, respectively, more easily, which can contribute to an increased mixing of the cooling liquid. Thus, the heat dissipation from the battery cells to the battery housing or to other cooling devices, such as, for example, a separate cooling device or heat exchangers, which is/are arranged within the housing, is improved. Preferably, the battery housing is gas- and liquid-tight.

The present description of the battery is based on a state of the battery, in which the battery is in a rest position and all cooling liquid is present in liquid form. This way, the battery is in a position, in which a bottom surface of the battery is directed in a downward direction. The cooling liquid is in a rest position and immobile. Obviously, the level of the cooling liquid is different, in particular compared to the position as described above, as soon as the battery is moved.

Preferably, the battery cell is enclosed by the cooling liquid in an amount of at least 2%. In this case, the percentage value represents a quotient, which is calculated from the ratio of the outer surface of the battery cell, which is enclosed by cooling liquid in relation to the total outer surface of the battery cell. This way of calculating of the percentage value also applies to all other embodiments within this application. The outer surface of the battery cell is formed, in particular, by the surface of a housing of the battery cell, as well as, if applicable, by the surface of a section of a conductor, and, if applicable, by a section of a heat conducting plate, which protrudes through the packaging.

Preferably, the battery cell is enclosed by the cooling liquid up to a maximum amount of 80%. Thereby, sufficient space remains within the battery housing, which is not occupied by cooling liquid. Thereby, the cooling liquid which is included in the battery housing has sufficient freedom to be moved around.

Preferably, the battery cell comprises at least a cell compartment, which is sealed by a packaging of the battery cell, in which cell compartment an electric cell is arranged. The packaging of the battery cell seals the cell compartment and protects the electric cell from any contact with the cooling liquid. In addition, the packaging of the battery cell assures that no substance passes from the electric cell into the battery housing and into the cooling liquid. Furthermore, the battery cell can form an electrical insulation between the cell compartment and the interior of the battery housing.

Preferably, a battery cell comprises at least two conductors, which protrude through a packaging of the battery cell. Provisions are made that, preferably, exactly two conductors protrude through the packaging of the battery cell. Said conductors form the contacts of the battery cell and are, preferably, connected in an electrically conductive manner with electrodes of the electrical cell, which are arranged within the packaging. The conductors themselves may show thermal conductivity, so that the conductors themselves effect a heat transfer from the cell interior through the packaging of the battery cell to the outside.

Preferably, the battery cell comprises a heat-conductive plate, wherein the heat-conducting plate comprises a section of the heat-conductive plate, which is arranged on the outside of the packaging of the battery cell. This section of the heat-conductive plate thus provides an area for heat transfer, which is further provided on the outside of the packaging of the battery cell, and thus, can dissipate heat from the battery cell to the surrounding, in particular, to the cooling liquid in the battery housing. Therein, preferably, the heat-conductive plate protrudes through the packaging of the battery cell and thereby forms a direct heat transfer path from the inside of the packaging to the outside of the packaging. Preferably, said section of the heat-conductive plate is at least partially, in particular completely, enclosed by the cooling liquid, which may result in improved heat dissipation.

Preferably, at least one conductor comprises a section of the conductor, which protrudes through the packaging of the battery cell and which is at least partially, in particular completely, enclosed by cooling liquid. The section of the conductor provides an area of the conductor, which protrudes through the packaging of the battery cell. The section of the conductor further comprises an area for heat transfer, at which heat, which is dissipated via the conductor from the packaging of the battery cell, may come into contact with the cooling liquid. Thus, the conductor itself comprises a heat transfer element, with which heat from the inside of the packaging of the battery cell may be dissipated to the outside of the packaging of the battery cell. Since said section of the conductor is, at least partially, enclosed by cooling liquid, heat transfer via the section of the conductor to the cooling liquid may be promoted. In particular, in case said section of the conductor is completely enclosed by a cooling liquid, heat dissipation may be increased. Therein, the cooling liquid may comprise an electrically non-conductive liquid.

Preferably, the battery cell is enclosed a cooling liquid to a maximum amount of 50%, in particular, up to a maximum amount of 20%, in particular, up to a maximum amount of 10% by. Furthermore, the battery cell may also be enclosed by a cooling liquid up to a maximum amount of 30% or up to a maximum amount of 40%.

These percentage values actually only refer to the percentage of the surface area of the packaging of the battery cell, which is enclosed by the cooling liquid. Therein, the respective surface area of sections of the conductors or of heat-conductive plates are not considered.

In particular, in case the battery cell is enclosed by a comparatively small amount of cooling liquid, heat transfer between the battery cell and the cooling liquid may take place via the heat-conductive plate and the section of the heat-conductive plate and/or the conductors and the section of the conductors. It is also possible that the packaging of the battery cell is not enclosed by a cooling liquid. In this case, a lower edge of the packaging is arranged above a cooling liquid level line. The cooling liquid level line represents the level of the cooling liquid in the rest position.

In a preferred embodiment, two conductors protrude, preferably in the same direction, through the packaging of the battery cell. This allows that the percentage of the enclosed area of the section of the conductor for both conductors can, essentially, be the same. This is of particular importance in case the conductors protrude in a downwards direction through the packaging of the battery cell. Thereby, the sections of the conductors of both conductors can extend into the cooling liquid, and, thereby, be enclosed by the cooling liquid, while, for example, the packaging of the battery cell is not, or only to a small part, enclosed by cooling liquid. In this case, a lower edge of the section of the conductor is arranged below a cooling liquid level line. These conditions, of course, must be fulfilled in the rest position.

Furthermore, the underlying objective of the invention is achieved by a battery arrangement comprising at least a battery of the above mentioned type, wherein the battery housing is connected to a cooler. In a preferred embodiment, the battery housing can be connected to a cooling device. The cooling device can be an external device, which is connected to the housing of the battery by connection lines. Either, the cooling liquid may be transported to the cooling device, so that the cooling liquid is cooled via the cooling device, or, alternatively, portions of an amount of gas, which are located above the cooling liquid, may be transported to the cooling device, as to be cooled down. In the connection lines between the battery housing and the cooling device one or several blowing units may be arranged. Thereby, an exit port of the battery housing is preferably connected to an entrance port of the cooling device, wherein the exit port of the battery housing is arranged above a cooling liquid level line. Since the exit port of the battery housing is arranged above the cooling liquid level line, mainly, and in particular exclusively, a portion of the amount of gas, in particular vapor of the cooling liquid, and only little cooling liquid, preferably no cooling liquid, is moved from the battery housing to the cooling device. The portion of an amount of gas can thus be cooled by the cooling device. Said portion of an amount of gas can be transported back into the battery housing by an additional connection line, which then leads to an additional cooling of the components, arranged within the battery housing, and of the cooling liquid. Preferably, the exit port of the battery housing is arranged within a lid area of the battery housing. By arranging the exit port in the lid area, the portion of liquid cooling liquid which can pass through the exit port towards the cooling device is minimized. In connection lines between the battery housing and the cooling device, one, two, or more blowing units may be provided. In particular, a blowing unit may be provided in each connection line.

Preferably, provisions are made so that cooling liquid may evaporate within the battery housing. During such an evaporation process, the temperature level is lowered. Preferably, the cooling device comprises a condenser. In said condenser, evaporated cooling liquid, i.e. cooling liquid vapor, may be converted into the liquid phase. The liquefied cooling liquid vapor may then be redirected or guided to the battery housing through an additional connection line. Preferably, provisions are made that cooling liquid may evaporate within the battery housing. During an evaporation process, the temperature level is lowered.

The underlying objective of the invention is further achieved by a method for cooling of a described battery, wherein at least a portion of the cooling liquid 4 is evaporated. Preferably, said evaporated portion of the cooling liquid is cooled by means of a cooling device. Furthermore, an evaporated portion of the cooling liquid may be condensed. The condensed vapor may be used again for cooling the battery cell.

BRIEF DESCRIPTION OF THE DRAWINGS

The invention is further illustrated by means of the following figures.

DETAILED DESCRIPTION

Figure 1:
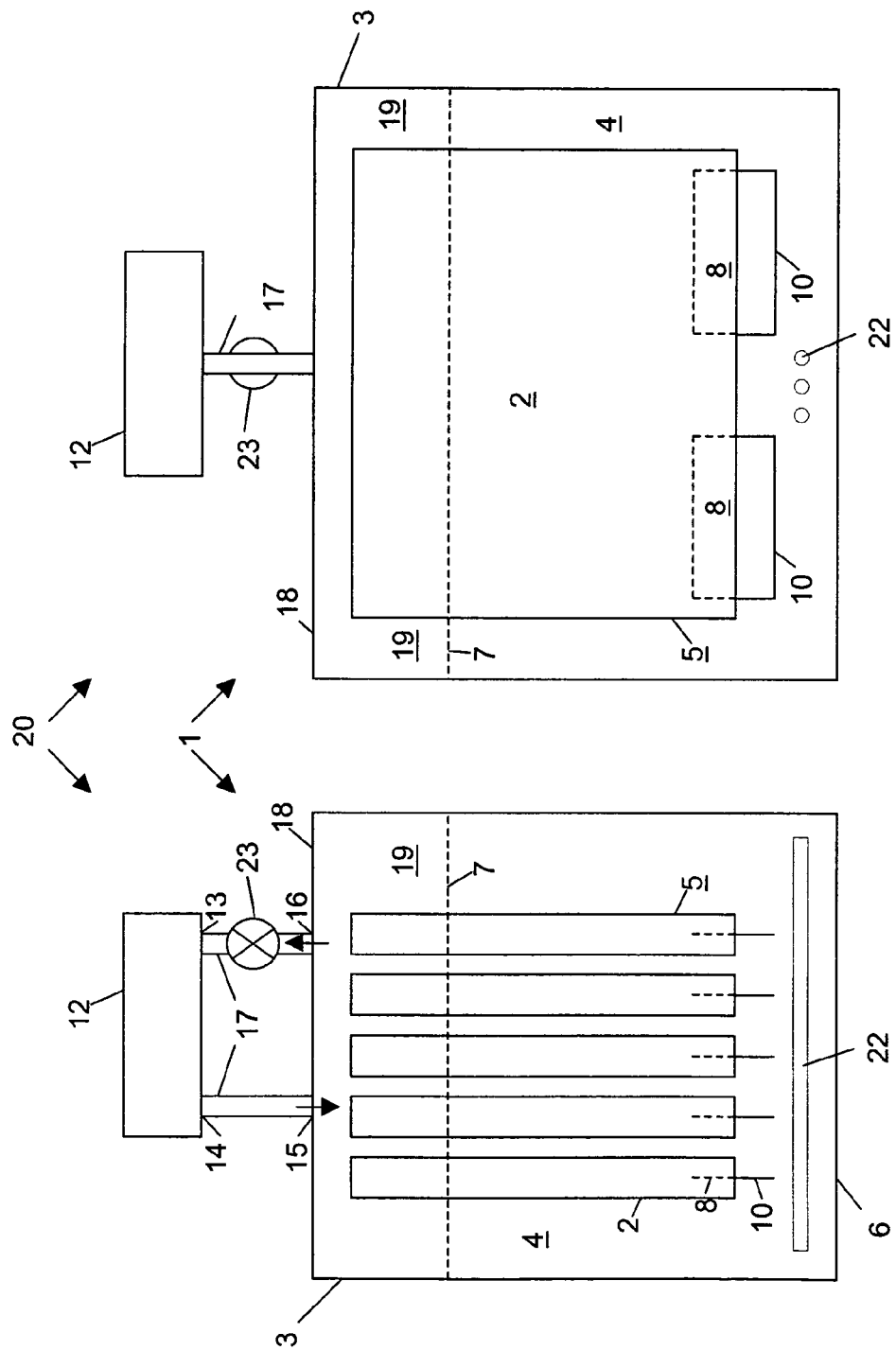
FIG. 1 shows in a sectional view a battery assembly according to the invention with a battery according to the invention in a first embodiment
 a) in a side view
 b) in a front view.

FIG. 1 shows battery 1 according to the invention in a rest position, wherein the battery is immobile in said rest position.

Battery 1 comprises a battery housing 3, which is filled with cooling liquid 4. In said rest position, a bottom area 6 of the battery housing 3 is located at the low part. Cooling liquid 4 is also immobile in the rest position. The battery housing is sealed in a gas- and liquid-tight manner vis-á-vis the outside, so that cooling liquid 4 cannot escape from the battery housing 3. Within the battery housing 3, five battery cells 2 are arranged at a respective distance to each other. Therein, battery cell 2 comprises a housing 5, which seals a cell compartment within the packaging 5 vis-á-vis the outside in a gas- and liquid-tight manner. Within the cell compartment, at least one electrochemical cell is arranged, which is not further described in this context. The electrochemical cell comprises, for example, several electrodes and at least an electrolyte between two electrodes. In the present embodiment, the electrochemical cell is configured as a rechargeable secondary battery cell.

Each battery cell 2 comprises two conductors 8, which protrude from the cell compartment through the packaging 5 of the battery cell 2 to the outside. Thereby, conductors 8 form an electrical connection through the packaging 5 of the battery cell. One or several electrodes may thus be electrically connected with a connection outside of the packaging 5 of the battery cell 2, which is not illustrated. Areas of the conductors 8 which are arranged within the packaging 5 are illustrated by dashed lines. Individual battery cells 2 may be connected with each other, in particular in parallel or in series. Conductors 8 are arranged on the bottom of the battery cell 2. Thereby, conductors 8 protrude in a lower area from or, respectively, through packaging 5.

As shown, cooling liquid 4, which fluid level is illustrated by a dashed fluid level line 7, only partially fills battery housing 3. The fluid level line 7 represents the level of the cooling liquid surface in the rest position of the battery 1. Thereby, an area above the fluid level line 7 is established, in which no cooling liquid is present and in which an amount of gas 19 may be present.

Conductors 8 are each provided with a section of the conductor 10, which protrudes through the packaging 5 of the battery cell 2. The sections of the conductors 10 are completely immersed into the cooling liquid 4, such that the cooling liquid 4 completely encloses said sections of the conductors 10.

Furthermore, battery cell 2 is so deeply immersed into the cooling liquid 4, that the packaging 5 of the battery cell 2 is also partially enclosed by cooling liquid. In other words, the cooling liquid level is so high, that the packaging 5 of the battery cell 2 is also partially enclosed by cooling liquid. Thereby, packaging 5 of the battery cell 2 is enclosed by the cooling liquid in an amount of 70%. Here, the percentage refers to the quotient of the surface area of the housing 5 of the battery cell 2, which is enclosed by cooling liquid, and the total surface area of the housing 5 of battery cell 2.

Since battery housing 3 is only partially filled with cooling liquid, the cooling liquid 4 may move freely around during movements of the battery 1, which, for example, may arise when driving a car. This leads to an increased mixing of the cooling liquid 4. This favors the heat transfer from the battery cells 2 to the housing 3 or to other cooling appliances as, for example, the cooling liquid lines 22.

A cooling device 12 is provided separately from the battery 1. Said cooling device is connected with the battery housing 3 via connecting lines 17. Thereby, an exit port 16 of the battery housing 3 is connected with an entrance port 13 of the cooling device 12. In addition, an exit port 14 of the cooling device 12 is connected with an entrance port 15 of the battery housing 3. Together with the cooling device, battery 1 and the connection lines 17 make up a battery assembly 20. In an alternative embodiment, a plurality of batteries may be connected to one or several cooling device(s).

Exit port 16 of the battery housing 3 is arranged above the cooling liquid level line 7 such, that a certain portion of the amount of gas 19 can be directed through the exit port 14 of the battery housing 3 towards the direction of the cooling device 12. Within the cooling device 12, a condenser is provided, which is not further illustrated. To improve the transport of vapor through the connection lines, a blowing unit 21 is arranged within a connection line 17 between the exit port 16 of the battery housing 3 and the entrance port 13 of the cooling device 12. In addition, or alternatively, a blowing unit may be arranged in a connection line 17 between the exit port 14 of the cooling device 12 and the entrance port 15 of the battery housing 3. A blowing unit may also be used as a pump in case liquid media needs to be transported.

In case the cooling liquid 4 gets warm or hot within the battery housing 3, a portion of the cooling liquid 4 may evaporate and form a portion of the amount of gas 19. Said evaporated portion of the cooling liquid is then directed through the exit port 16 of the battery housing 3 into the connection line 17 to the entrance port 13 of the cooling device 12, and reaches there the condenser of the cooling device 12. In the condenser, the evaporated cooling liquid 4 condenses, and is subsequently discharged to the battery housing 3 as condensed and cooled cooling liquid via the exit port 14 of the cooling device 12, and via additional connection line 17 and the entrance port 15 of the battery housing. By means of evaporating a portion of the cooling liquid, an additional cooling effect is achieved, which, overall, improves the cooling process of the battery assembly.

Near the bottom area 6 of the battery housing 3, a heat exchanger in form of a cooling liquid line 22 is arranged, which additionally contributes to the cooling of the cooling liquid.

Figure 2:
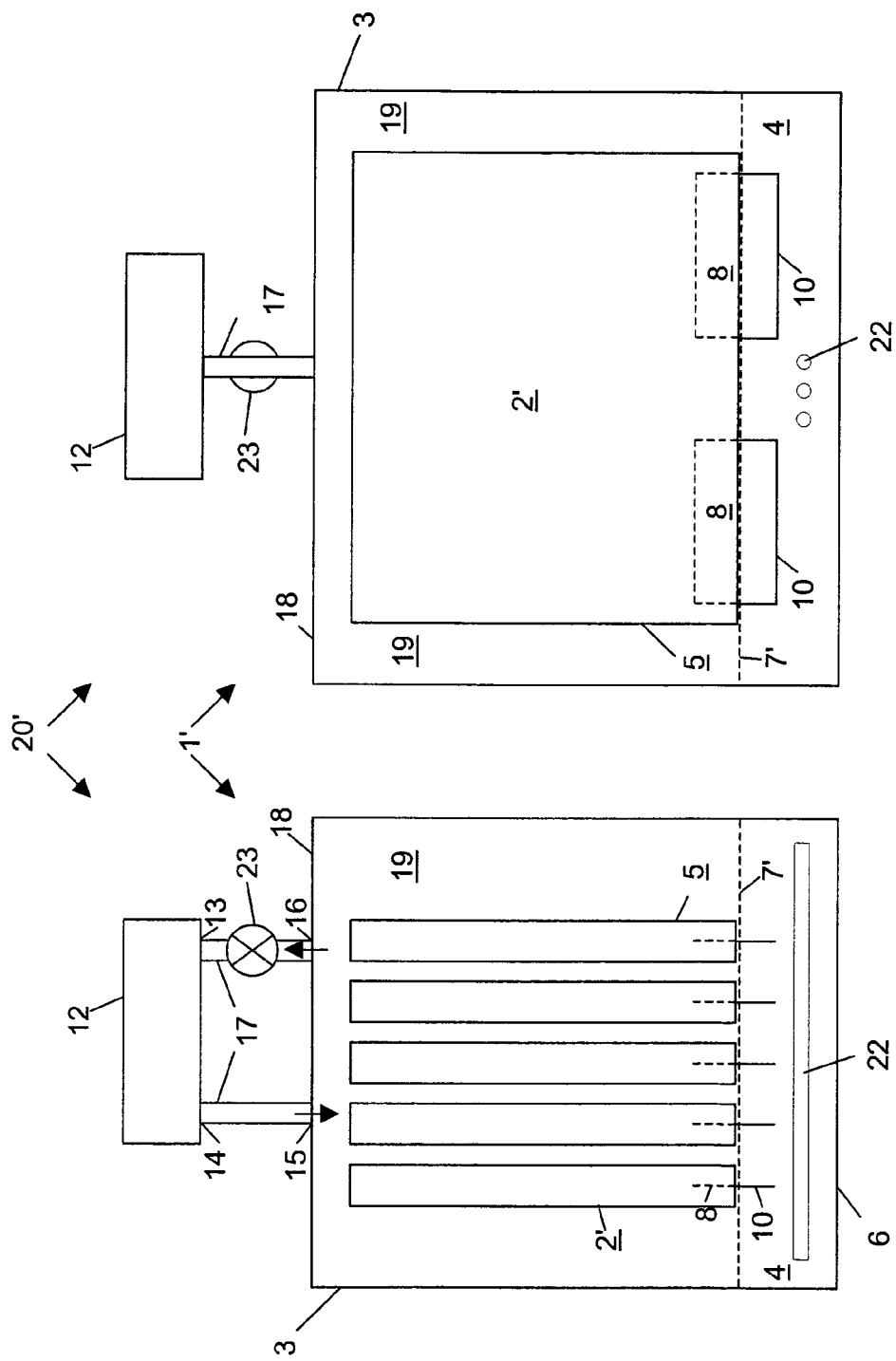
FIG. 2 shows in a sectional view a battery assembly according to the invention with a battery according to the invention in a second embodiment
 a) in a side view
 b) in a front view.

FIG. 2 shows an alternative embodiment of a battery 1', which, with respect to the design and the function, essentially resembles the battery 1 of FIG. 1. In the following, only the differences between battery 1' and battery 1 of FIG. 1 are outlined.

Battery 1' comprises fewer cooling liquid 4 than the battery 1 of FIG. 1. Thereby, only sections of the conductors 10 of the conductors 8 are enclosed by cooling liquid 4.

Packaging 5 is not enclosed by cooling liquid 4, since the fluid level line 7' is arranged below the packaging 5. Since the surface area of the sections of the conductors 10, which protrude through the packaging 5, only comprise about 5% of the total surface area of the battery cell 2, the battery cell is thus enclosed in an amount of about 5% by cooling liquid 4.

Figure 3:
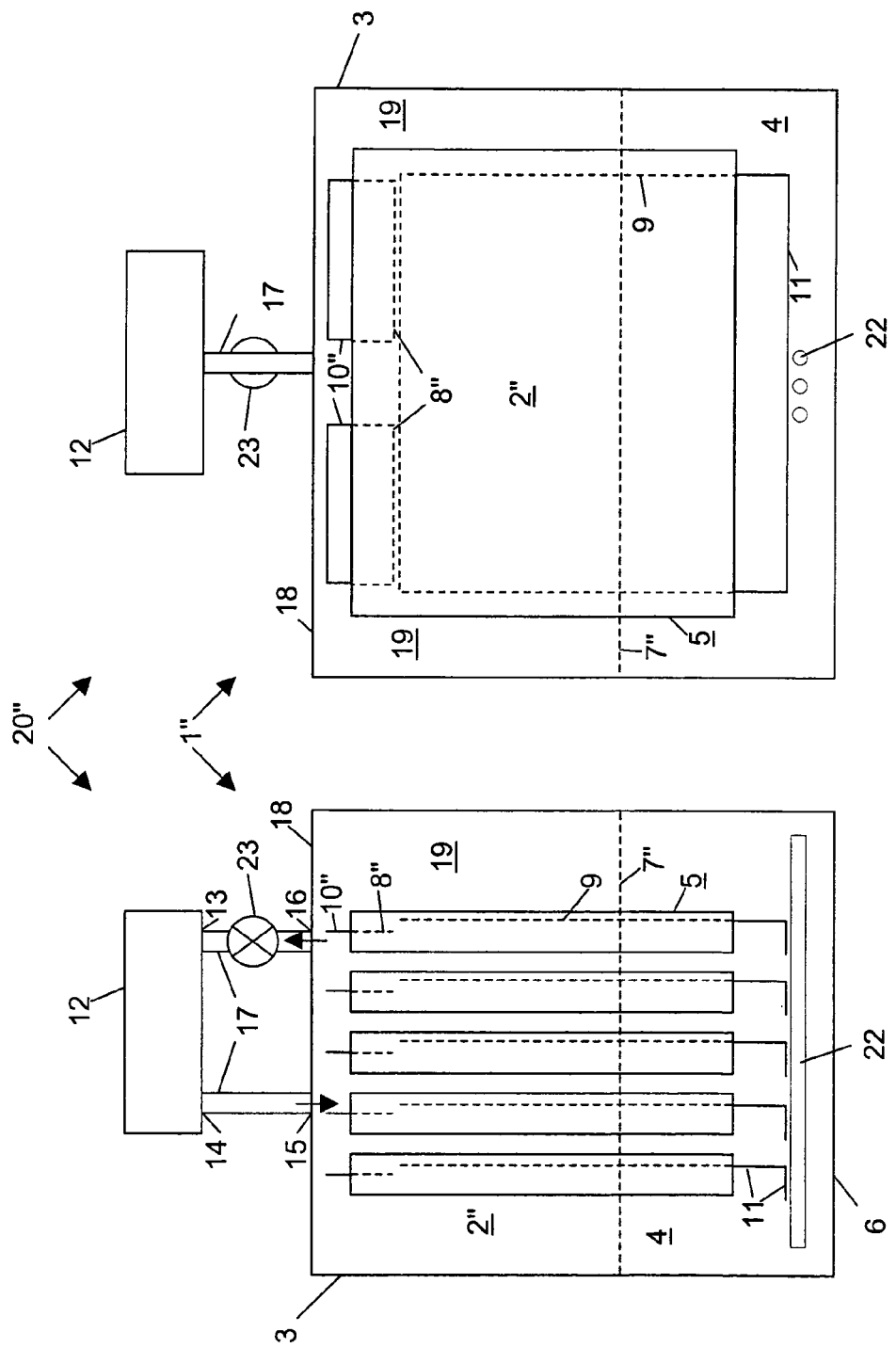
FIG. 3 shows in a sectional view a battery assembly according to the invention with a battery according to the invention in a third embodiment
 a) in a side view
 b) in a front view.

FIG. 3 shows an additional embodiment of a battery 1", which, with respect to the design and the function, essentially resembles the battery 1 of FIG. 1. In the following, only the differences between the battery 1" and the battery 1 of FIG. 1 are outlined.

Battery 1" comprises a plurality of battery cells 2", wherein each of the battery cells 2" comprises a heat-conductive plate 9. The heat-conductive plate is partially arranged within the packaging 5. A section of the heat-conductive plate 11 protrudes through the packaging 5. The section of the heat-conductive plate 11 is arranged at the bottom of the packaging 5 and is completely enclosed by a cooling liquid 4. At the lower end, the heat-conductive plate 11 is bent to a degree of 90°. Conductors 8" comprise sections of the conductors 10", which protrude through the packaging 5. The sections of the conductors 10" protrude through the packaging 5 on an upper side of the packaging 5. Thereby, said sections of the conductors 10" are not enclosed by a cooling liquid 4. The fluid level line 7 is higher than the one in the battery of FIG. 2, or, respectively, lower than the one in the battery of FIG. 1. Battery cell 2 is enclosed by a cooling liquid 4 in an amount of about 50%, wherein for calculating the surface area of the battery cell, the surface area of the packaging 5, the surface area of the sections of the conductors 10", as well as the surface area of the section of the heat conducting plates 11 are considered.

Figure 4:
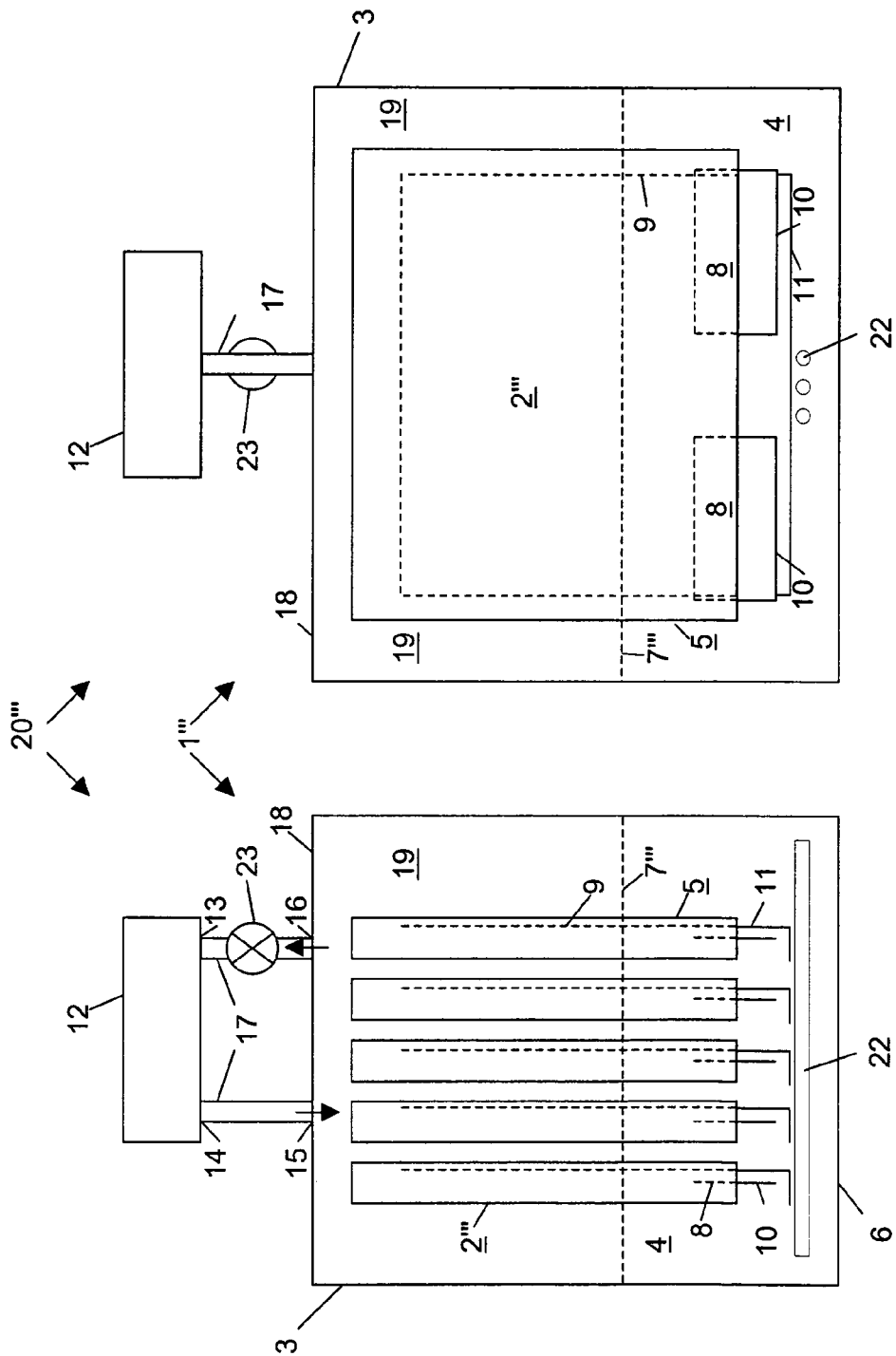
FIG. 4 shows in a sectional view a battery assembly according to the invention with a battery according to the invention in a forth embodiment
 a) in a side view
 b) in a front view.

FIG. 4 shows an additional alternative embodiment of a battery 1''', which, with respect to the design and the function, essentially resembles the battery 1 of FIG. 1. In the following, only the differences between the battery 1''' and the battery 1 of FIG. 1 are outlined.

In case of battery 1''', the sections of the conductors 10 as well as the sections of the heat-conducting plates 11 protrude through the packaging 5 of each respective battery cell 2 at the lower part. The fluid level of the cooling liquid 4 approximately corresponds to the fluid level according to the battery 1" of FIG. 3 such that the packaging 5 of the battery cell is partially enclosed by cooling liquid. Both the section of the conductor 10 as well as the section of the heat-conducting plate 11, respectively, is completely enclosed by a cooling liquid 4.

LIST OF REFERENCE NUMBERS 1 battery
2 battery cell
3 battery housing
4 cooling liquid
5 packaging
6 bottom area
7 fluid level line
8 conductor
9 heat conducting plate
10 section of the conductor
11 section of the heat conducting plate
12 cooling device
13 entrance port of the cooling device
14 exit port of the cooling device
15 entrance port of the battery housing
16 exit port of the battery housing
17 connection line
18 lid area
19 amount of gas
20 battery assembly
21 blowing unit
22 cooling liquid line

The invention claimed is:

1. A battery comprising:
at least one battery cell including
a casing,
at least two current conductors, which protrude through the bottom of the casing such that respective portions of the at least two current conductors are disposed outside the casing, and
a heat conducting plate disposed in the interior of the battery cell and extending through the bottom of the casing such that a portion of the heat conducting plate is disposed outside the casing;
a battery housing, the at least one battery cell being arranged in the battery housing;
a cooling liquid, the battery housing being partially filled with the cooling liquid, wherein the at least one battery cell is enclosed by the cooling liquid in an amount of at least 2% and up to a maximum amount of 50%, wherein the portions of the at least two current conductors are completely enclosed by the cooling liquid and the portion of the heat conducting plate is completely enclosed by the cooling liquid.

2. The battery according to claim 1, wherein the battery cell comprises metal hydride cells, lithium ion cells, or lithium polymer cells.

3. The battery according to claim 1, wherein the battery cell comprises at least one cell compartment, which is sealed by the casing of the battery cell, and in which an electrical cell is arranged.

4. The battery according to claim 1, wherein the battery cell is enclosed by a cooling liquid up to a maximum amount of 10%.

5. A battery assembly, comprising at least one battery according to claim 1, wherein a cooling device is connected to the battery housing.

6. The battery assembly according to claim 5, wherein an exit port of the battery housing is connected to an entrance port of the cooling device, wherein the exit port of the battery housing is arranged above a coolant level line.

7. The battery assembly according to claim 5, wherein an exit port of the battery housing is connected to an entrance port of the cooling device, wherein the exit port of the battery housing is arranged in a lid area of the battery housing.

8. The battery assembly according to claim 5, wherein the cooling device comprises a condenser.

9. The battery assembly according to claim 5, wherein an exit port of the cooling device is connected to an entrance port of the battery housing.

* * * * *